United States Patent
Hall et al.

(10) Patent No.: US 10,666,156 B2
(45) Date of Patent: May 26, 2020

(54) METHOD TO DYNAMICALLY CONFIGURE AND CONTROL A POWER CONVERTER FOR WIDE INPUT RANGE OPERATION

(71) Applicant: Schweitzer Engineering Laboratories, Inc., Pullman, WA (US)

(72) Inventors: Bruce A. Hall, Pullman, WA (US); Sean D. Robertson, Moscow, ID (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 0 days.

(21) Appl. No.: 16/282,660

(22) Filed: Feb. 22, 2019

(65) Prior Publication Data
US 2020/0112262 A1    Apr. 9, 2020

Related U.S. Application Data

(60) Provisional application No. 62/742,776, filed on Oct. 8, 2018.

(51) Int. Cl.
*H02M 3/335*  (2006.01)
*H02M 1/08*  (2006.01)
*H02H 7/12*  (2006.01)

(52) U.S. Cl.
CPC ....... *H02M 3/33592* (2013.01); *H02M 1/083* (2013.01); *H02H 7/1213* (2013.01)

(58) Field of Classification Search
CPC ............. H02M 3/335; H02M 3/33507; H02M 3/33523; H02M 3/33562; H02M 3/33576; H02M 3/33592; H02M 1/083; H02H 7/1213

USPC ........................................... 363/21.01–21.18
See application file for complete search history.

(56) References Cited

U.S. PATENT DOCUMENTS

| | | | |
|---|---|---|---|
| 8,675,325 B2* | 3/2014 | Beierschmitt | H01H 71/123 361/78 |
| 9,699,848 B2 | 7/2017 | Herfurth | |
| 9,787,191 B2 | 10/2017 | Barrenscheen | |
| 9,912,231 B2 | 3/2018 | Wang | |
| 9,912,241 B2 | 3/2018 | Ivankovic | |
| 2011/0273910 A1 | 11/2011 | Baurle | |
| 2012/0147631 A1* | 6/2012 | Nate | H02M 3/33507 363/21.15 |

(Continued)

OTHER PUBLICATIONS

STMicroelectronics, "L6566B Multi-Mode Controller for SMPS" 2008. Retrieved from: https://www.st.com/en/power-management/l6566b.html.

(Continued)

*Primary Examiner* — Yemane Mehari
(74) *Attorney, Agent, or Firm* — Bradley W. Schield

(57) ABSTRACT

The present disclosure relates to power converters that convert power in different control modes based on the input voltage. For example, a power converter may include power conversion circuitry that receives electrical energy from an input at an input voltage and provides the electrical energy at an output voltage. The power converter may include control circuitry that receives a signal indicating the input voltage. The control circuitry may select a control mode from a plurality of control modes based at least in part on the input voltage. The control circuitry may control operation of the switch of the power conversion circuitry based at least in part on the control mode selected.

19 Claims, 4 Drawing Sheets

(56) References Cited

U.S. PATENT DOCUMENTS

2014/0268921 A1* 9/2014 Knoedgen ......... H02M 3/33515
                                                363/21.16
2016/0352231 A1* 12/2016 Quigley ............ H02M 3/33507
2017/0005583 A1*  1/2017 Choi ................. H02M 3/33553
2017/0288554 A1* 10/2017 Fahlenkamp ........... H02M 1/08
2018/0062530 A1*  3/2018 Kong ..................... H02M 1/08
2018/0351464 A1* 12/2018 Finkel ............... H02M 3/33507

OTHER PUBLICATIONS

Texas Instruments, "LM5023 AC-DC Quasi-Resonant Current Mode PWN Controller" Apr. 2013. Revised Jan. 2016. Texas Instruments, Dallas, TX USA.

* cited by examiner

METHOD TO DYNAMICALLY CONFIGURE AND CONTROL A POWER CONVERTER FOR WIDE INPUT RANGE OPERATION

RELATED APPLICATIONS

This application claims priority under 35 U.S.C. § 119 to U.S. Provisional Patent Application No. 62/742,776 filed on Oct. 8, 2018, titled "Method to Dynamically Configure and Control a Power Converter for Wide Input Range Operation," which is hereby incorporated by reference in its entirety.

TECHNICAL FIELD

The present disclosure relates generally to power systems and, more particularly, to a power converter that operates across a wide range of input voltages.

BRIEF DESCRIPTION OF THE DRAWINGS

Non-limiting and non-exhaustive embodiments of the disclosure are described herein, including various embodiments of the disclosure with reference to the figures listed below.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Electric power delivery systems are used to distribute electric power from electric power generation sources to loads, which may be close or distant from the generation sources. Such systems may include generators or other sources, transformers that step up or down voltages, transmission lines, buses, distribution lines, voltage regulators, capacitor banks, reactors, circuit breakers, switches, and other such equipment. Electric power delivery equipment may be monitored, automated and/or protected using intelligent electronic devices (IEDs).

Many IEDs, such as relays, may have hardware that is designed to operate at certain internal voltages to perform monitoring, automation, and/or protection operations. To operate at the desired internal voltages, the relays may be designed to receive power at a certain predesigned input voltage. For instance, the relay may include a power converter that converts power from a certain preset voltage to another preset voltage to allow the relay to perform the protective actions on the power system.

However, having preset values for input voltages may cause difficulties in installing the relay. Further, because different installation locations of relays may operate at different voltages, a relay with a preset input voltage may not be able to be moved from location to location, thereby reducing installation flexibility of the relay. Accordingly, there is a need to allow IEDs to receive various input voltages to power monitoring and/or protection circuitry of the IED that is designed to operate at certain internal voltages.

Figure 1:
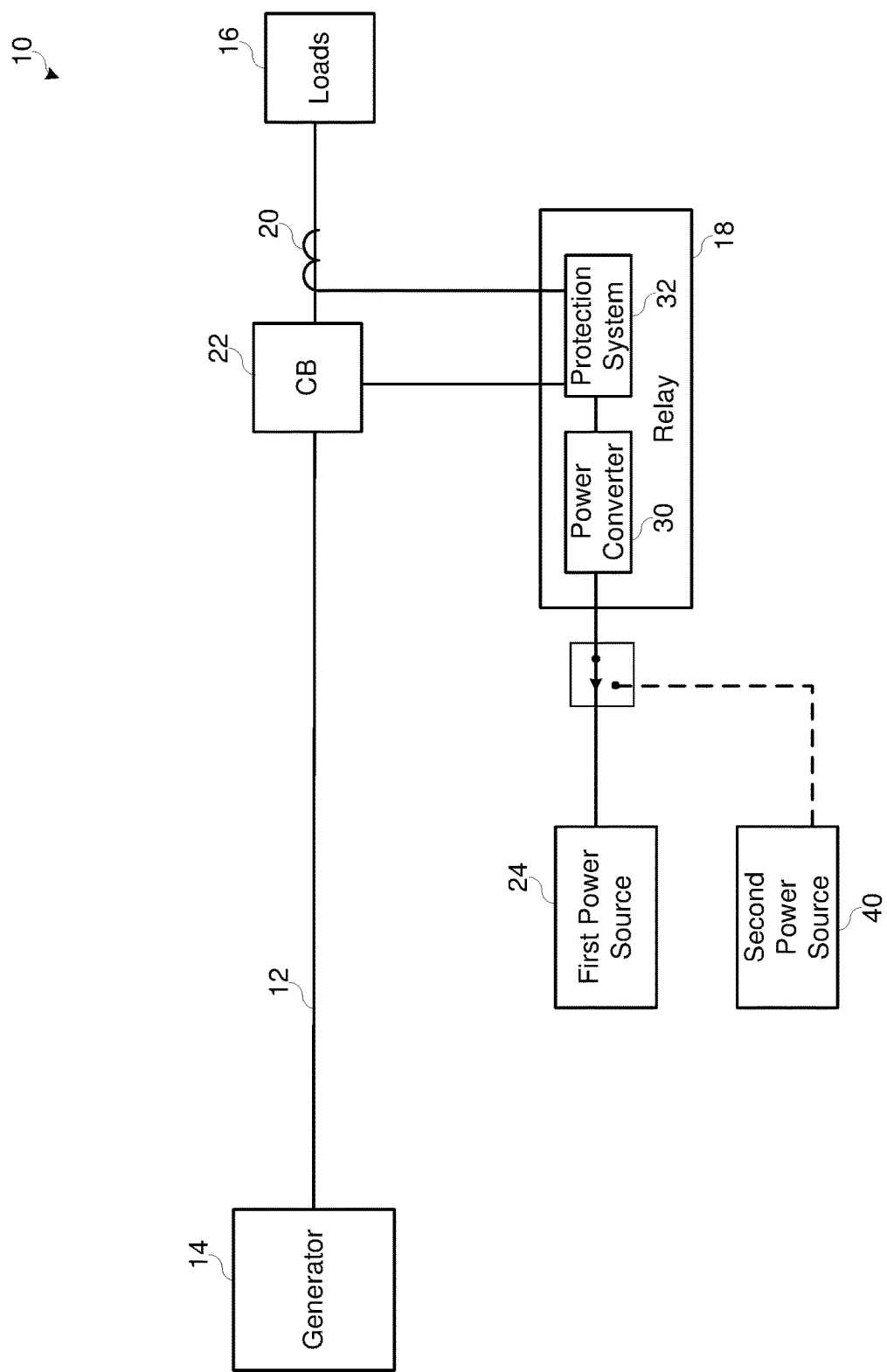
FIG. 1 illustrates a block diagram of an electric power delivery system having a relay that is powered via a power converter, in accordance with an embodiment.

FIG. 1 illustrates a block diagram of an electric power delivery system 10 that generates, transmits, and distributes electrical energy to loads, consistent with embodiments of the present disclosure. In the illustrated embodiment, the electric power delivery system 10 includes an electric generator 14 that provides power to one or more loads 16 via power line 12. While a simplified electric power delivery system 10 is shown, any suitable electric power delivery system may be used. For example, the electric power delivery system may be a three phase power system, a radial power system, a bi-directional power system, a transmission system, a distribution system, or the like.

The electric power delivery system 10 may be monitored, controlled, automated, and/or protected using intelligent electronic devices (IEDs), such as relay 18. As mentioned above, IEDs in the electric power delivery system 10 may be used for protection, control, automation, and/or monitoring of equipment in the system. For example, IEDs may be used to monitor equipment of many types, including electric transmission lines, electric distribution lines, current transformers, busses, switches, circuit breakers, reclosers, transformers, autotransformers, tap changers, voltage regulators, capacitor banks, generators, motors, pumps, compressors, valves, and a variety of other types of monitored equipment.

As used herein, an IED, such as relay 18, may refer to any microprocessor-based device that monitors, controls, automates, and/or protects monitored equipment within the electric power delivery system 10. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, digital sample publishing units, merging units, and the like. The term IED may be used to describe an individual IED or a system comprising multiple IEDs.

The relay 18 may include one or more sensors, such as current transformers 20, potential transformers, and the like, to detect various characteristics of the power line 12. For instance, the relay 18 may detect current being delivered on the power line 12. The relay 18 may include a power converter 30 and a protection system 32. The protection system 32 may receive signals from the sensors and determine whether to control operation of the circuit breaker 22 based on the signals received. In the illustrated embodiment, the relay 18 may detect an overcurrent on the power line 12 and may send a signal to a circuit breaker 22 to cause the circuit breaker 22 to trip to disconnect the generator 14 from the load 16. In some embodiments, the relay 18 may receive signal(s) communicated wirelessly from other electronic devices and determine whether to trip the circuit breaker 22 from the remote signal(s). While these are simply given as examples, any suitable IED may be used in conjunction with the disclosed systems and methods.

As mentioned above, IED hardware, such as the protection system 32, may be designed to operate at certain internal voltages. For example, the protection system 32 may operate by receiving electrical energy at a certain input voltage (e.g., within a tolerance of a preset voltage) from the power converter 30. The power converter 30 may convert the power received from the power source 24 into power having characteristics suitable for operating various hardware and/or components of the relay.

Further, it may be desirable to use the relay 18 with different power sources to allow the relay 18 to be used in a wider variety of locations. For example, it may be desirable to use the relay 18 with either a first power source 24 that provides power at a lower voltage (e.g., 19.2-60 volts) or a second power source 40 that provides power at a higher voltage (e.g., 60-300 volts), as compared to the relatively lower voltage. In the illustrated embodiment, the first power source 24 may be a 24V direct current (DC) power source and the second power source 40 may be a 120V AC power source. Moreover, the power converter 30 may operate more efficiently in different control modes with different input voltages. That is, it may be more efficient to use different control modes depending on whether the first power source 24 or the second power source 40 is used.

As described below, the power converter 30 may include control circuitry that selects a control mode in which to control power conversion circuitry based at least in part on the received input voltage to allow the relay 18 to receive power from different power sources at different voltages in an efficient manner. For example, the control circuitry may operate in a first control mode, such as fixed frequency pulse width modulation (PWM) peak current control mode, when the input voltage is within a first voltage range (e.g., 19.2V-60V) and to operate in a second control mode, such as quasi-resonant (QR) control mode, when the input voltage is within a second voltage range (e.g., 60V-300V). While fixed frequency PWM peak current and QR control modes are described in detail in the illustrated embodiment, note that any other suitable combinations of additional and/or alternative current or voltage control modes, such as hysteretic control mode, may be used.

Figure 2:
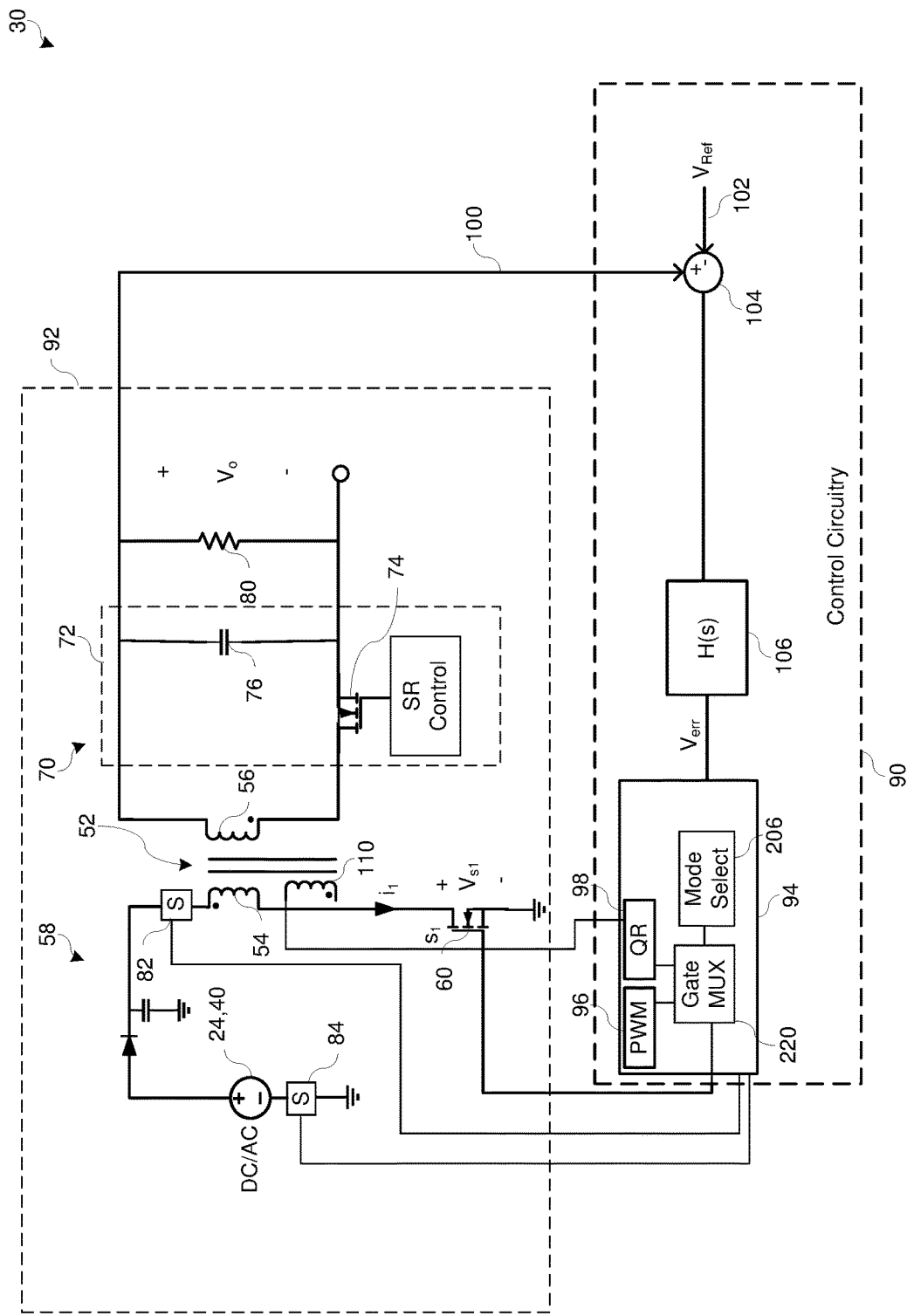
FIG. 2 illustrates a circuit diagram of the power converter of FIG. 1 that provides power according to a first control mode or a second control mode, in accordance with an embodiment.

FIG. 2 illustrates a circuit diagram of the power converter 30 that converts electrical energy received from the power source 24 or 40 using a control mode that is based on the input voltage. The power converter 30 includes a flyback transformer 52 (e.g., coupled inductors) that has primary winding 54 and secondary winding 56. On the primary side 58, the primary winding 54 is connected to a power source, such as the first power source 24 or the second power source 40. Further, the primary winding 54 is electrically connected to a switch 60. The switch 60 may be a transistor, such as an n-channel metal-oxide-semiconductor field-effect transistor (MOSFET), a bipolar junction transistor (BJT), or any other suitable switching device.

On the secondary side 70, the secondary winding 56 may be electrically connected to rectification circuitry 72, such as a capacitor 76 and MOSFET 74 used as synchronous rectifier. The secondary side 70 may include one or more loads 80. In the illustrated embodiment, the load may be the protection system 32 and/or other hardware that controls operation of the relay 18.

The power converter 30 may include control circuitry 90 that controls operation of the switch 60. By controlling the switch 60, the flow of current $i_1$ through the primary winding 54 may be controlled to produce the desired output voltage $V_o$. For instance, when the control circuitry 90 sends a signal to the switch 60 to cause the switch 60 to close, current may flow through the primary winding 54 to cause the primary winding 54 to become energized. Conversely, when the switch 60 is open, the primary winding 54 may transfer energy to the secondary winding 56 until the stored energy is transferred to the load or until the switch 60 is closed again. The flyback transformer 52 and the hardware and/or components on the primary side 58 and the secondary side 70 may generally be referred to as power conversion circuitry 92.

The control circuitry 90 may include a set of control mode systems 94 with which to control the switch 60. For example, the control circuitry 90 may include fixed frequency PWM peak current control mode circuitry 96 to control the switch 60 in a PWM peak current control mode and QR control mode circuitry 98 to control the switch 60 in a QR control mode. The control circuitry 90 may receive the input voltage that is provided by the power source 24 or 40 from voltage sensors 82 and 84. Sensor 84 may be used to detect ground to determine voltage difference between the sensors 82 and 84. Further, the control circuitry 90 may select a control mode, via mode selection circuitry (e.g., a comparator 206) from the set of control modes (e.g., QR control mode, fixed frequency control mode), based on the input voltage, and a gate multiplexer 220 may be controlled based on the control mode selected by the mode selection circuitry. In the illustrated example, the control circuitry 90 may control the switch 60 via an output of the PWM control mode circuitry 96 when the voltage is between 19.2-60 volts and to control the switch 60 via an output of the QR control mode circuitry 98 when the input voltage is between 60-300 volts. By controlling the switch 60 according to different control modes, efficiency of the power converter 30 may be improved over a switch that was to use a single control mode. For instance, QR control mode may reduce switching losses in the switch 60 by switching at valleys of the voltage across the primary switch when operating at higher voltage, thereby operating more efficiently at higher voltage. Conversely, fixed frequency PWM control mode may operate more efficiently at lower voltages because PWM control may have lower peak current stress by operating in continuous conduction mode (CCM) and have lower conduction and switching losses than the QR control mode.

The control circuitry 90 may receive feedback 100 from the voltage output and compare the voltage output to a reference voltage 102 at comparator 104. The difference between the voltage output and the reference voltage may be provided to an error amplifier 106 (e.g., transfer function H(s)), which may provide an error signal ($V_{err}$) to the PWM control mode circuitry 96 and QR control mode circuitry 98 proportional to the difference between the desired output voltage ($V_o$) and the reference voltage ($V_{ref}$). The error signal ($V_{err}$) may be used to control peak current ($i_1$) through the primary winding 54.

Figure 3:
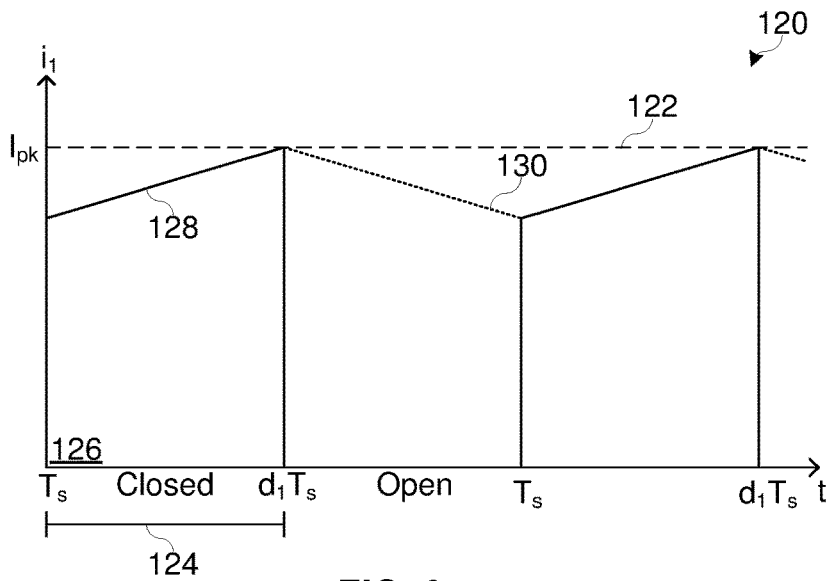
FIG. 3 illustrates a plot of current with respect to time in the first PWM control mode of FIG. 2, in accordance with an embodiment.

FIG. 3 illustrates a plot 120 of current with respect to time in which the power converter 30 operates in fixed frequency PWM peak current control mode via the PWM control mode circuitry 96. By controlling the set peak current 122 ($I_{pk}$) of $i_1$ based on $V_{err}$, the width 124 of the pulses 126 of current $i_1$ may be controlled to maintain the desired output voltage. That is, at time $d_1 T_s$, the PWM control mode circuitry 96 may send a signal to a gate of the switch 60 that causes the switch 60 to open, and send a signal at time $T_s$ to cause the switch 60 to close. For fixed frequency PWM peak current control mode, the frequency may be fixed by separate clock cycles. For example, if the peak current 122 increases because the output voltage was below the reference voltage as indicated by $V_{err}$, the PWM control mode circuitry 96 may close the switch 60 for a longer duration to increase the width 124 of the pulse 126. By increasing the duration in which the switch 60 is closed due to the longer time to reach peak current 122, the current $i_1$ may cause more energy to transfer to the secondary winding 56 to increase output voltage. Conversely, if the peak current 122 decreases because the output voltage was above the reference voltage, the width 124 of the pulse 126 may decrease to cause the primary winding 54 to energize for a shorter duration, thus causing less energy to transfer to the secondary winding 56 resulting in a decreased output voltage.

The current on the secondary side 72 reflected to the primary via the turn ratio of the transformer is indicated by the dashed line 130. While the illustrated embodiment indicates that the power converter 30 is operating in continuous conduction mode (CCM) in PWM control mode where the current does not fall to zero, the power converter 30 may operate in discontinuous conduction mode (DCM).

Returning to FIG. 2, in the QR control mode, the QR control mode circuitry 98 may receive a signal providing information about the voltage ($V_{s1}$) across the switch 60 via auxiliary winding 110. The QR control mode circuitry 98 may send a signal to the switch 60 to control operation of the switch 60 based on characteristics of $V_{s1}$. For example, in QR control mode, the QR control mode circuitry 98 may close the switch when a valley is detected in $V_{s1}$.

Figure 4:
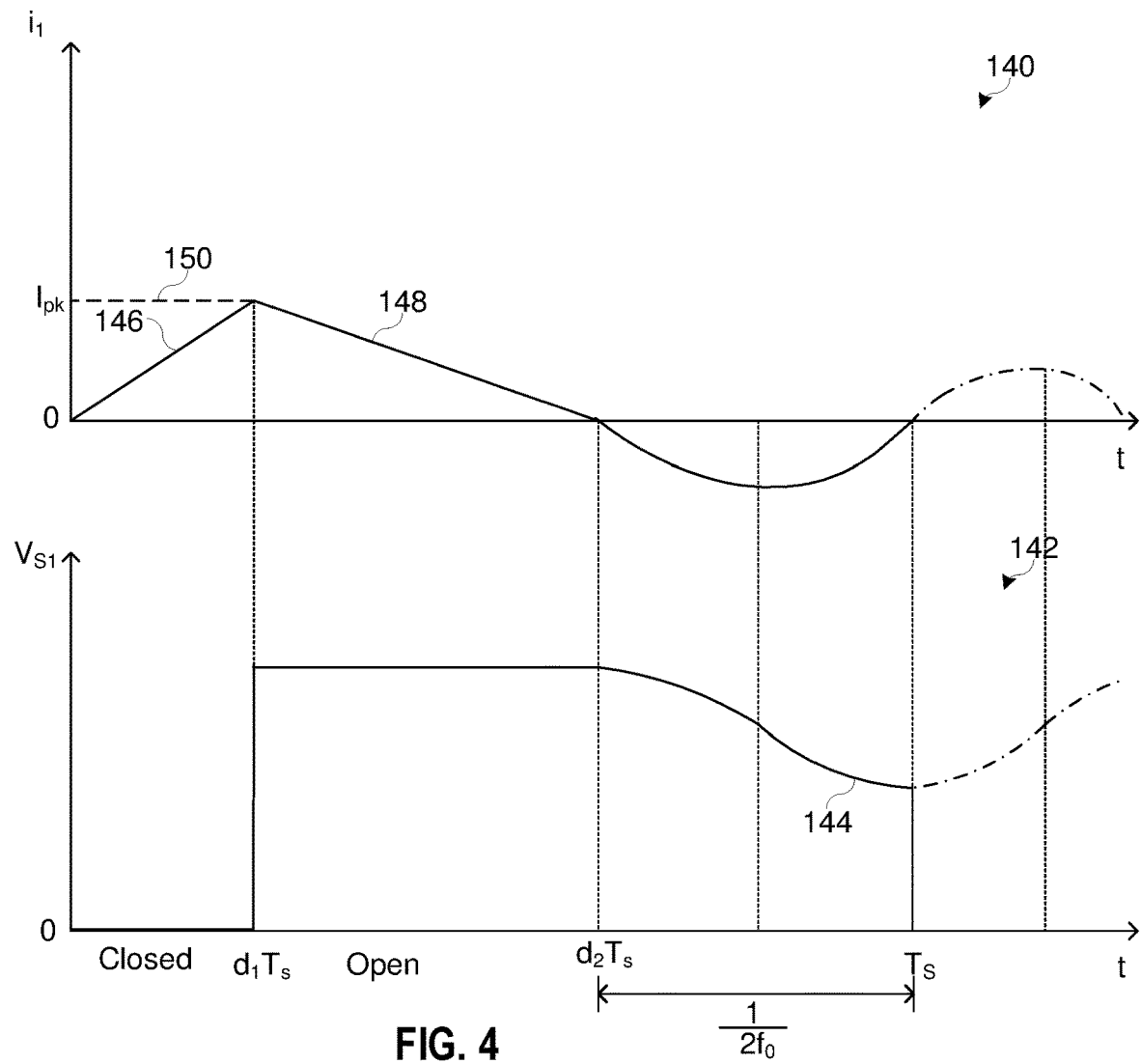
FIG. 4 illustrates a set of plots that show current and voltage with respect to time in the second QR control mode of FIG. 2, in accordance with an embodiment.

FIG. 4 illustrates a set of time-aligned plots 140 and 142 in which the power converter 30 operates in QR control mode via the QR control mode circuitry 98. The current $i_1$ may increase (e.g., ramp 146) while the switch 60 is closed. When the switch 60 is open at time $d_1 T_s$, the voltage across the switch $V_{s1}$ increases due to the energy associated with peak current 150 in the primary winding 54. Upon the transformer 52 de-magnetizing due to energy transfer to the load 80 (e.g., as indicated by current drop 148), the voltage across the switch 60 may resonate with one or more valleys 144. The QR control mode circuitry 98 may detect the valley 144 and control operation of the switch 60 based on the detected valley 144 to reduce switching loss when switch 60 is turned on. Upon detecting the valley 144, the QR control mode circuitry 98 may close the switch 60 to re-energize the primary winding 54 prior to energy transfer to the secondary winding 56. While the illustrated embodiment may detect the initial valley 144, subsequent valleys may be detected.

Figure 5:
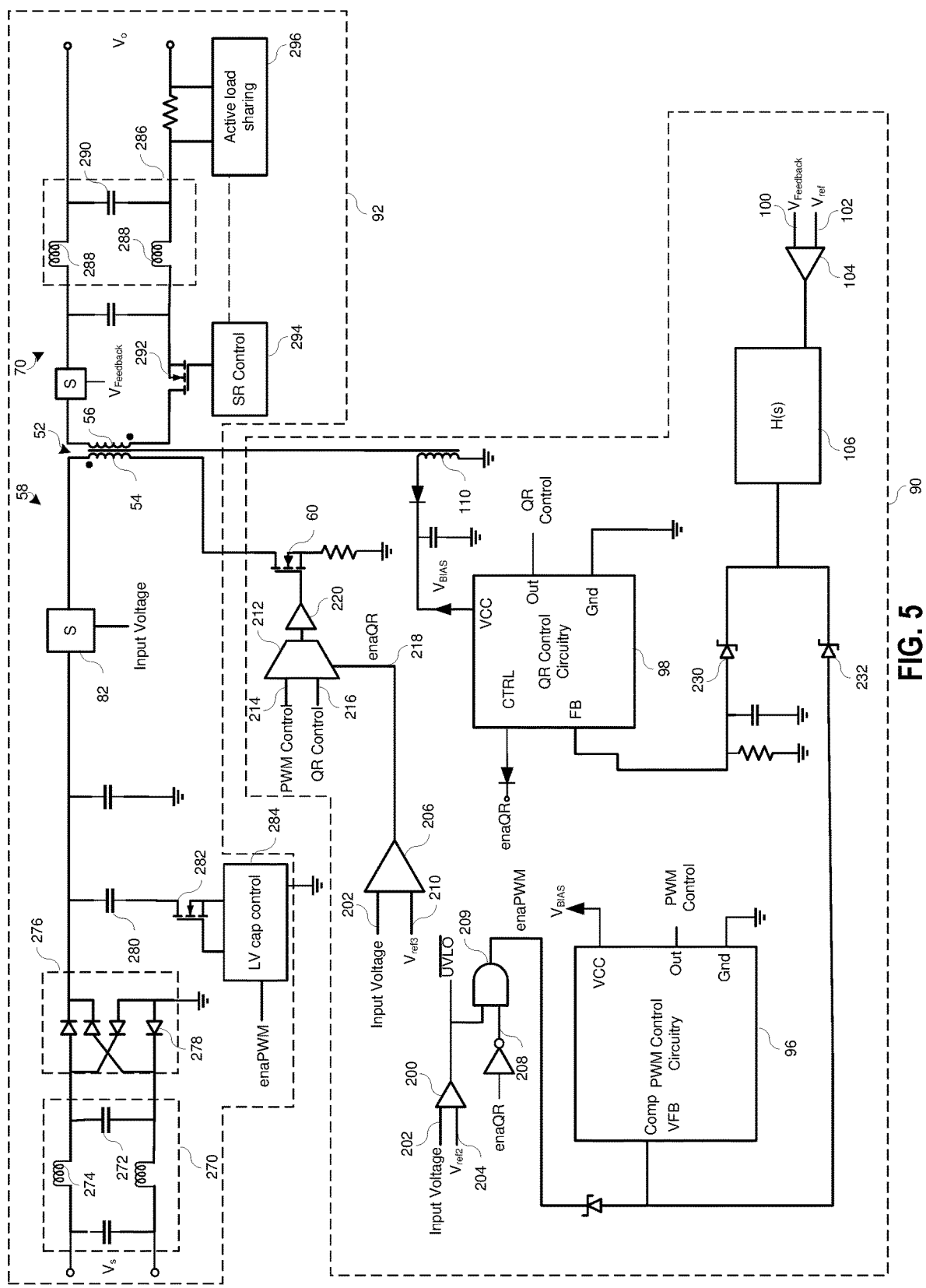
FIG. 5 illustrates a circuit diagram of the power converter of FIG. 2 having first control mode circuitry for operating in the first control mode and second control mode circuitry for operating in the second control mode, in accordance with an embodiment.

FIG. 5 illustrates a circuit diagram of an embodiment of the power converter 30 that uses different control modes to control the switch 60 based on the input voltage. In the illustrated embodiment, the control circuitry 90 includes an undervoltage lockout comparator 200 that compares an input voltage 202 to a reference voltage 204 ($V_{ref2}$) to determine whether the voltage is sufficient for operation. If the input voltage 202 is greater than the minimum threshold voltage 204 and the QR control mode 218 is not activated (enaPWM 208 is activated), AND gate 209 may output a signal indicating that fixed frequency PWM control mode is enabled. The control circuitry 90 further includes an enable QR comparator 206 that asserts an enable QR signal (enaQR) when the input voltage 202, detected by the sensor 82, is greater than a reference voltage 210 ($V_{ref3}$) to enable the QR control mode.

The control circuitry 90 includes a multiplexer 212 that selects either the output of the fixed frequency PWM control mode circuitry 96 or the output of the QR control mode circuitry 98 based on assertion of the enable QR signal 218. In the illustrated embodiment, the multiplexer 212 includes a first input 214 that receives a PWM control signal, output from the PWM control mode circuitry 96, to control the switch according to the fixed frequency PWM control mode. The multiplexer 212 includes a second input 216 that receives a QR control signal, output from the QR control mode circuitry 98, to control the switch 60 according to the QR control mode. The multiplexer 212 may include a selection input 218 that receives a selection signal indicating whether to operate in either the QR control mode or the fixed frequency PWM control mode. The multiplexer 212 may output a selected signal of either the PWM control signal or the QR control signal based on the selection signal. The selected signal may be buffered by gate driver 220, and used to drive the gate voltage of the switch 60.

The multiplexer 212 may prevent gate drive contention between the fixed frequency PWM control mode circuitry 96 and the QR control mode circuitry 98 and/or ensure that control of the switch 60 is dedicated to either PWM control mode or QR control mode. In other words, the PWM control mode circuitry 96 or QR control mode circuitry 98 that is interconnected to the gate of the switch 60 to control the switch 60 may be dynamically selected by the multiplexer 212 from the output of the enable QR comparator 206 depending on the applied input voltage. By operatively interconnecting, based on the input voltage, either the PWM control mode circuitry 96 or the QR control mode circuitry 98 via the multiplexer 212, the control circuitry 90 may dynamically reconfigure the single-stage switching converter topology of the power converter 92. While PWM and QR modes are described as examples in the illustrated embodiment, these may be referred to generally as first control mode and second control mode and may be any suitable combination of modes.

In the illustrated example, secondary-side voltage regulation may be performed by using optocouplers and steering diodes 230 and 232 to support independent feedback paths. Additionally and/or alternatively, primary-side regulation may be performed using the auxiliary winding 110. For example, the QR control mode circuitry 98 may receive, from the auxiliary winding 110, a signal indicating a voltage across the switch 60. As discussed above, the QR control mode circuitry 98 may close the switch 60 when a voltage valley occurs.

The power converter 92 may include input EMI filter circuitry 270, such as capacitors 272 and inductors 274, that reduces noise coupling to the input. The power converter 30 may also include rectification circuitry 276, such as diodes 278. When the control circuitry 90 is in the lower voltage mode (e.g., input voltage is between 19.2 volts and 60 volts), the PWM control mode circuitry 96 may send an enable PWM assert signal to cause the bulk capacitor 280 to be switched into circuit by switch 282.

Low voltage capacitor control circuitry 284 may manage the switch 282 commutation, including provisions for inrush current limiting when the capacitor 280 is initially discharged and switched into circuit. To perform active power factor correction, the bulk capacitor 280 may be electrically disconnected to lower the capacitance (e.g., relative to when the bulk capacitor 280 is connected) in the power converter 92 in QR mode operation. At lower line voltages, in PWM mode of operation, additional bulk capacitance from bulk capacitor 280 may switched into circuit by switch 282 to ensure stability by maintaining adequate impedance mismatch and/or separation between the power converter 92 and the EMI filter circuitry 270. That is, the capacitance of the power converter 92 may be changed dynamically depending on the control mode selected from the input voltage.

The power converter 92 may have output EMI filter circuitry 286, such as inductors 288 and capacitor 290, to reduce noise due to EMI in the power output. The power converter 92 may include a synchronous rectifier 292, or a fast recovery diode, on the secondary side 70. The synchronous rectifier 292 may be controlled via synchronous rectifier control circuitry 294. While a single output is shown in FIG. 5, note that any suitable number of outputs may be used in various applications. Further, the output voltage $V_o$ may support active load sharing 296 for parallel output operation (or for redundancy).

In the illustrated embodiment in FIG. 5, the PWM control mode circuitry 96 and the QR control mode circuitry 98 may each be embodied as separate integrated circuits. While the embodiments described above use different integrated circuits to perform the PWM and QR operations, in other embodiments, the control circuitry 90 may be embodied as a microprocessor, a general purpose integrated circuit, an application specific integrated circuit ("ASIC"), or a field programmable gate array ("FPGA"). For example, the control circuitry 90 may be implemented as a controller or microcontroller having a processor to provide for digital control of the PWM and QR operations. The microcontroller may have memory that includes instructions to cause the processor to execute the operations described herein. The memory may be any suitable non-transitory computer readable medium to store the instructions.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A power converter, comprising:
   a power conversion circuitry configured to receive electrical energy from an input at an input voltage and to provide the electrical energy at an output voltage; and
   a control circuitry configured to:
      receive a signal indicating the input voltage;
      select a control mode from a plurality of control modes based at least in part on the input voltage, wherein the control mode is selected at a rate less than a line frequency when the input is connected to an alternating current (AC) power source;
      dynamically configure a circuit topology of the power converter according to the selected control mode; and
      control operation of a switch of the power conversion circuitry, via the configured circuit topology, to cause the power conversion circuitry to provide the electrical energy at the output voltage.

2. The power converter of claim 1, wherein the configured topology comprises interconnections that are actively used to control operation of the switch.

3. The power converter of claim 1, wherein the control circuitry comprises first control mode circuitry configured to control operation of the switch in a first control mode of the plurality of control modes and second control mode circuitry, different from the first control mode circuitry, configured to control operation of the switch in a second control mode of the plurality of control modes.

4. The power converter of claim 3, wherein the first control mode circuitry comprises fixed-frequency pulse width modulation (PWM) peak current control mode circuitry and the second control mode circuitry comprises quasi-resonant (QR) control mode circuitry.

5. The power converter of claim 3, wherein the first control mode circuitry comprises a first integrated circuit and the second control mode circuitry comprises a second integrated circuit, separate from the first integrated circuit.

6. The power converter of claim 3, wherein the control circuitry comprises a multiplexer having a first input configured to receive a first control signal from the first control mode circuitry to control the switch according to the first control mode and having a second input configured to receive a second control signal from the second control mode circuitry to control the switch according to the second control mode, wherein the multiplexer is configured to select, based at least in part on the input voltage, either the first control signal or the second control signal.

7. The power converter of claim 6, wherein the multiplexer is configured to provide either the first control signal or the second control signal, via an amplifier gate driver, to a gate of the switch to control the operation of the switch.

8. The power converter of claim 1, wherein each control mode of the plurality of control modes comprises at least one input used to determine the operation of the switch that is different from other control modes of the plurality of control modes.

9. The power converter of claim 1, wherein the power conversion circuitry comprises a flyback switching converter.

10. A method, comprising:
   receiving, via a control circuitry, a signal indicating an input voltage of power conversion circuitry of an electronic device;
   selecting, via the control circuitry, a control mode from a plurality of control modes based at least in part on the input voltage, wherein the control mode is selected at a rate less than a line frequency when the input is connected to an alternating current (AC) power source;
   dynamically configure a circuit topology of the power converter according to the selected control mode; and controlling, via the control circuitry and the configured circuit topology, operation of a switch of the power conversion circuitry according to the control mode selected to cause the power conversion circuitry to provide the electrical energy at the output voltage.

11. The method of claim 10, comprising:
receiving, via a multiplexer of the control circuitry, a first input indicating a first control signal to control the switch according to a first control mode of the plurality of control modes;
receiving, via the multiplexer, a second input indicating a second control signal to control the switch according to a second control mode of the plurality of control modes;
selecting, via the multiplexer, either the first control signal or the second control signal based at least in part on the input voltage of the power conversion circuitry; and
outputting, via the multiplexer, the selected one of the first control signal or the second control signal.

12. The method of claim 11, wherein the multiplexer is configured to receive the first control signal from first control mode circuitry and to receive the second control signal from second control mode circuitry, different from the first control mode circuitry.

13. The method of claim 10, comprising selecting the control mode from the plurality of control modes based on the input voltage being greater than or below a voltage threshold.

14. The method of claim 10, wherein the plurality of control modes comprises at least a fixed-frequency pulse width modulation (PWM) peak current control mode and a quasi-resonant (QR) control mode.

15. The method of claim 14, comprising controlling the switch based at least in part on a voltage measured across the switch when operating in the QR control mode.

16. The method of claim 14, comprising modulating a pulse width by controlling a peak current through primary winding on a primary side of the power conversion circuitry based at least in part on a voltage measured on a secondary side of the power conversion circuitry when operating in the PWM peak current control mode.

17. An intelligent electronic device, comprising:
a power conversion circuitry configured to:
receive power from a power source at an input voltage;
convert the received power from the power source into a power output at an output voltage;
a protection circuitry configured to operate using power output from the power converter; and
a control circuitry configured to:
select, via the control circuitry, a control mode from a plurality of control modes based at least in part on the input voltage, wherein the control mode is selected at a rate less than a line frequency when the input is connected to an alternating current (AC) power source;
dynamically configure a circuit topology of the power converter according to the selected control mode; and
control operation of a switch of the power converter, via the configured circuit topology, according to the control mode selected.

18. The intelligent electronic device of claim 17, wherein the protection circuitry is configured to send a signal to trip a circuit breaker when an event is detected.

19. The intelligent electronic device of claim 17, wherein the control circuitry comprises a multiplexer configured to select a first control mode from the plurality of control modes when the input voltage falls below a threshold voltage and to select a second control mode from the plurality of control modes when the input voltage is greater than the threshold voltage.

* * * * *